Oct. 18, 1960   H. W. MADDEN   2,956,697
UNSTACKING MACHINE
Filed Nov. 10, 1958   6 Sheets-Sheet 3
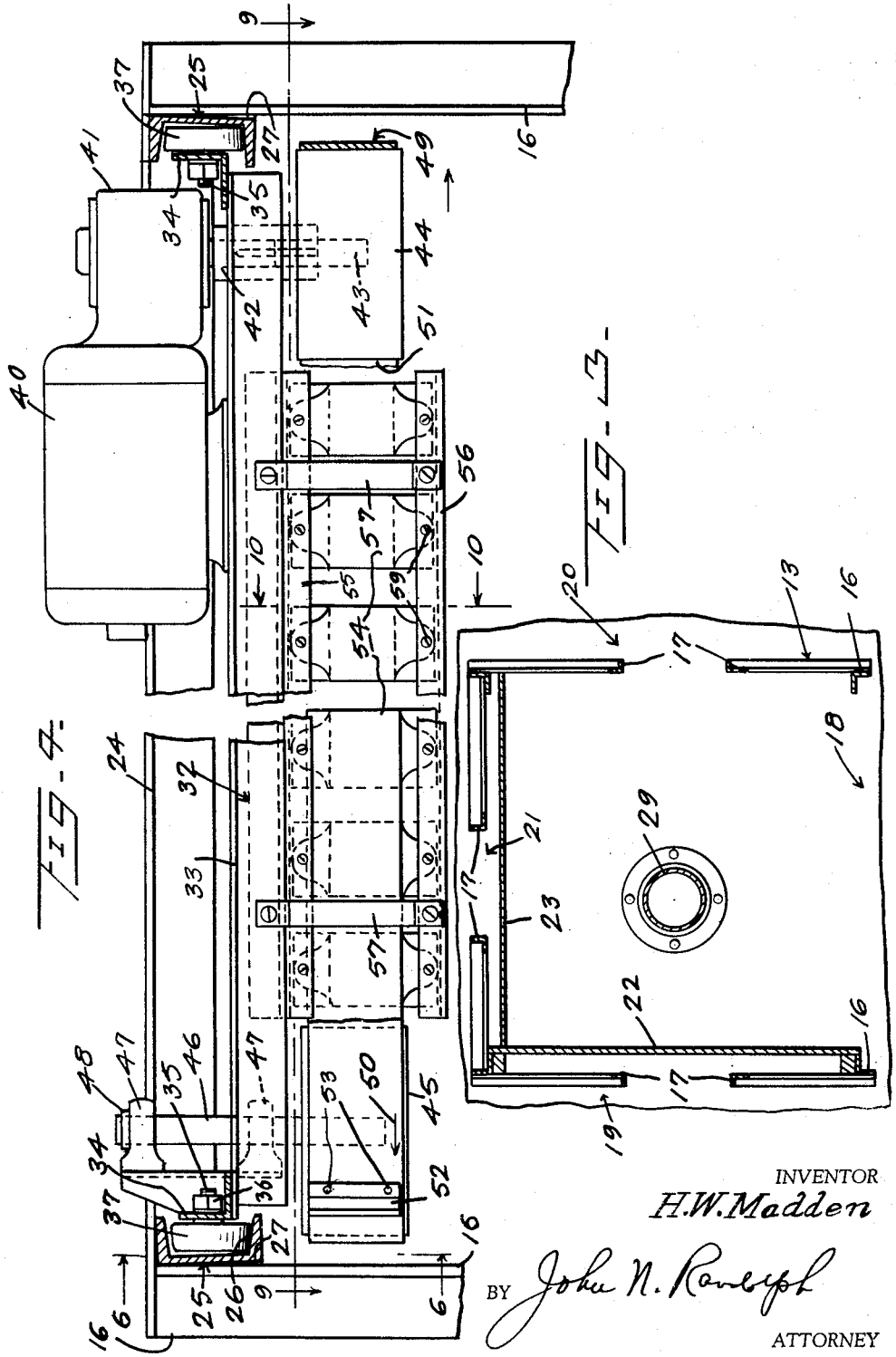
INVENTOR
H. W. Madden
BY John N. Randolph
ATTORNEY

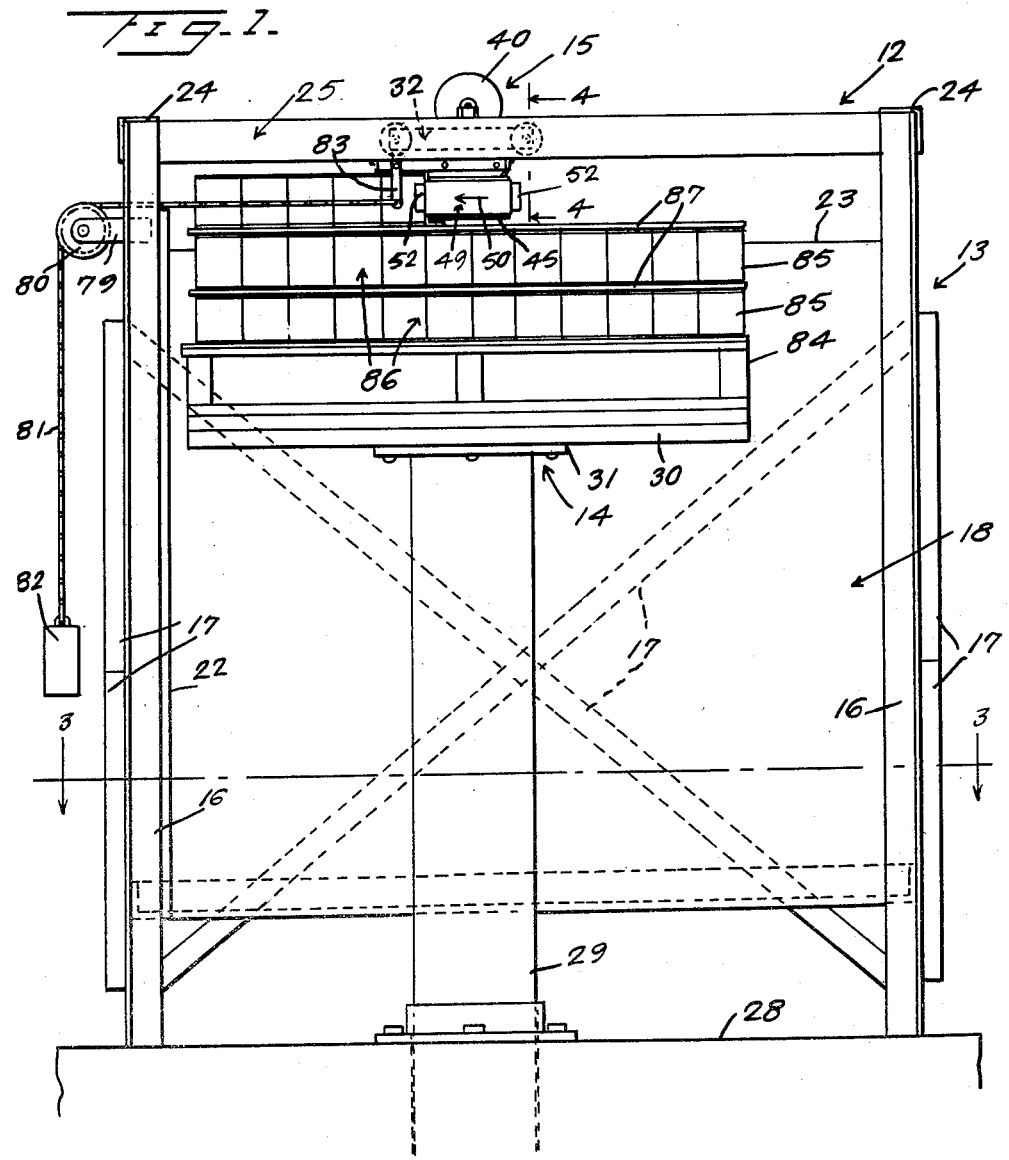

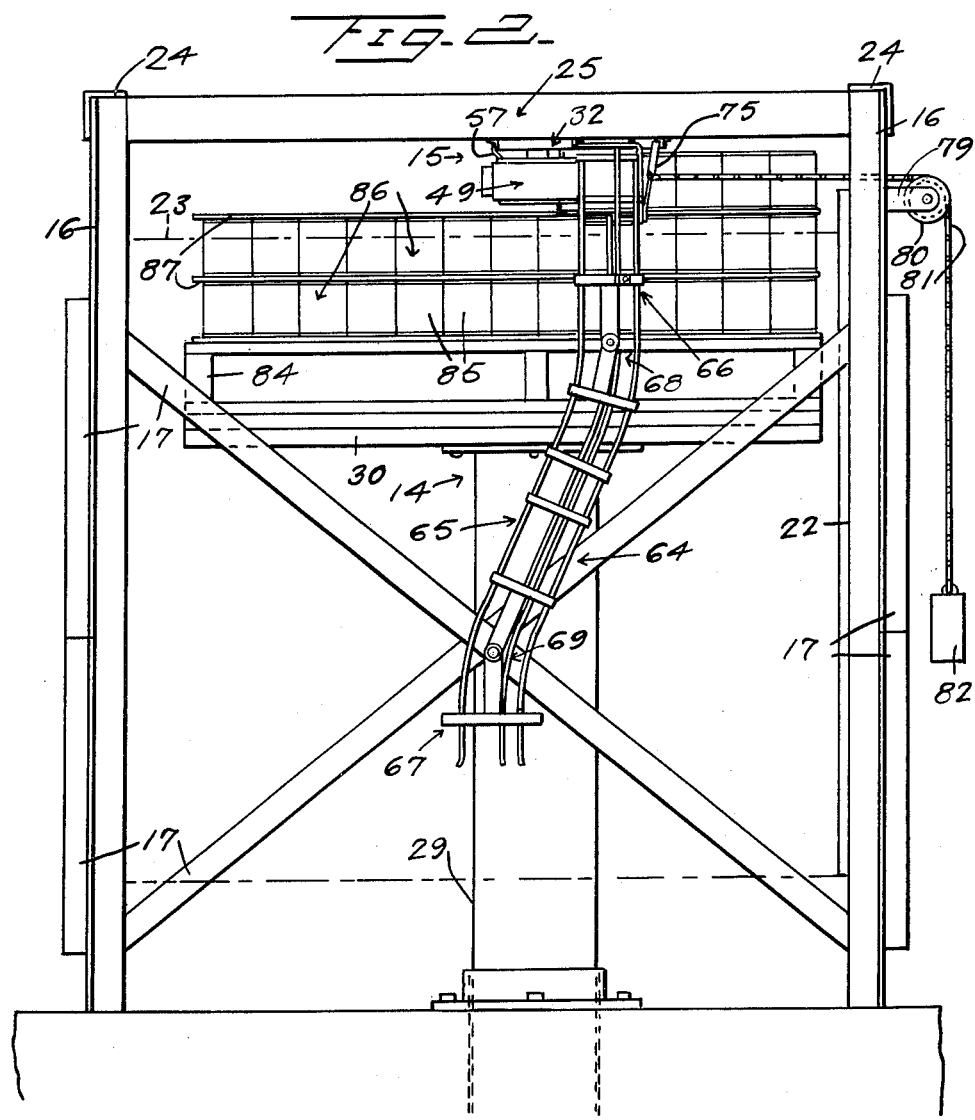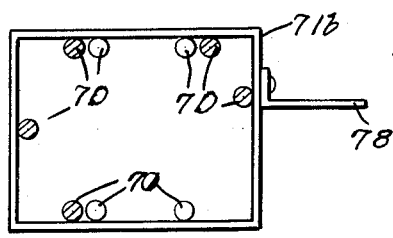

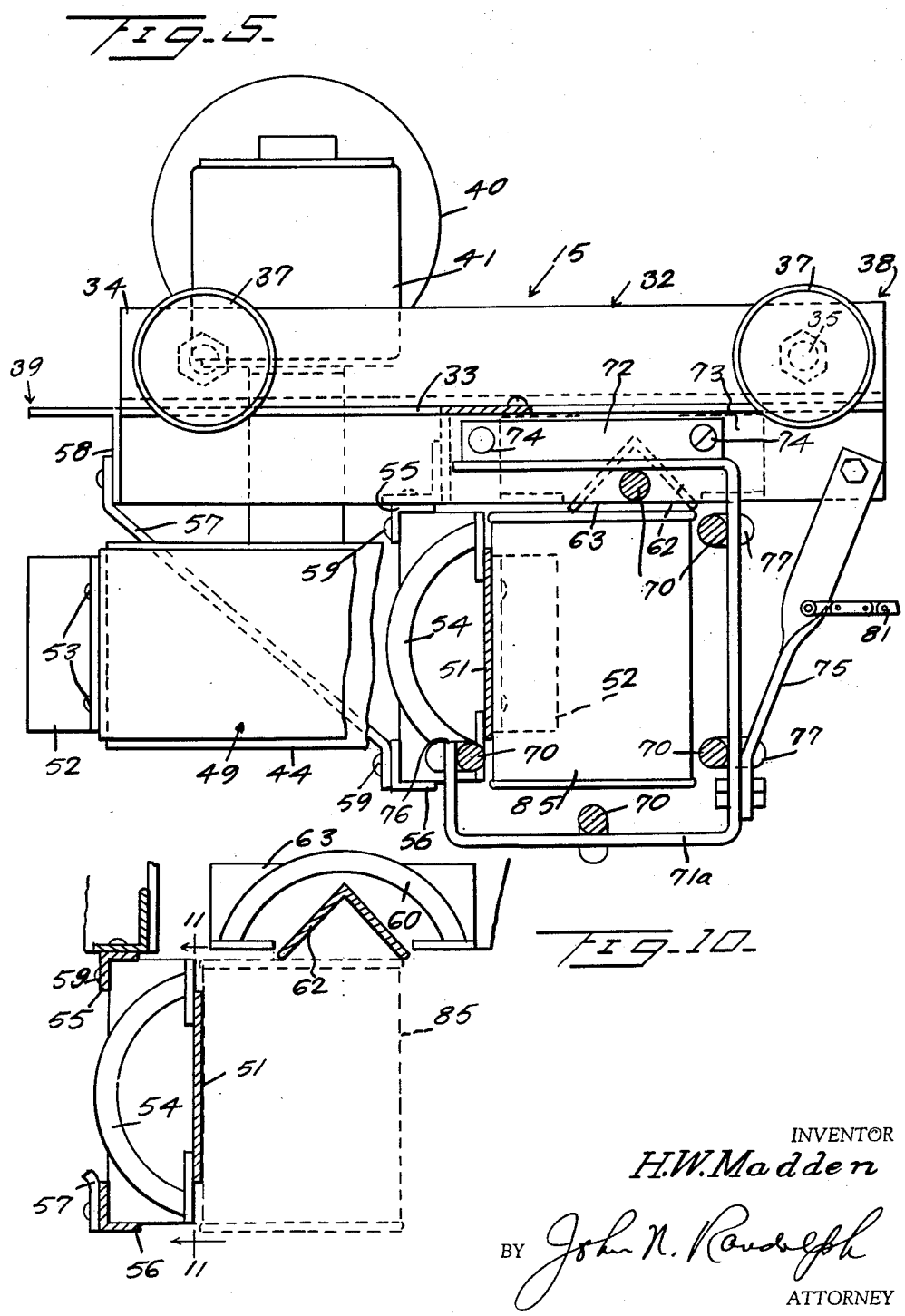

Oct. 18, 1960 H. W. MADDEN 2,956,697
UNSTACKING MACHINE
Filed Nov. 10, 1958 6 Sheets-Sheet 5

INVENTOR
H.W. Madden
BY John N. Randolph
ATTORNEY

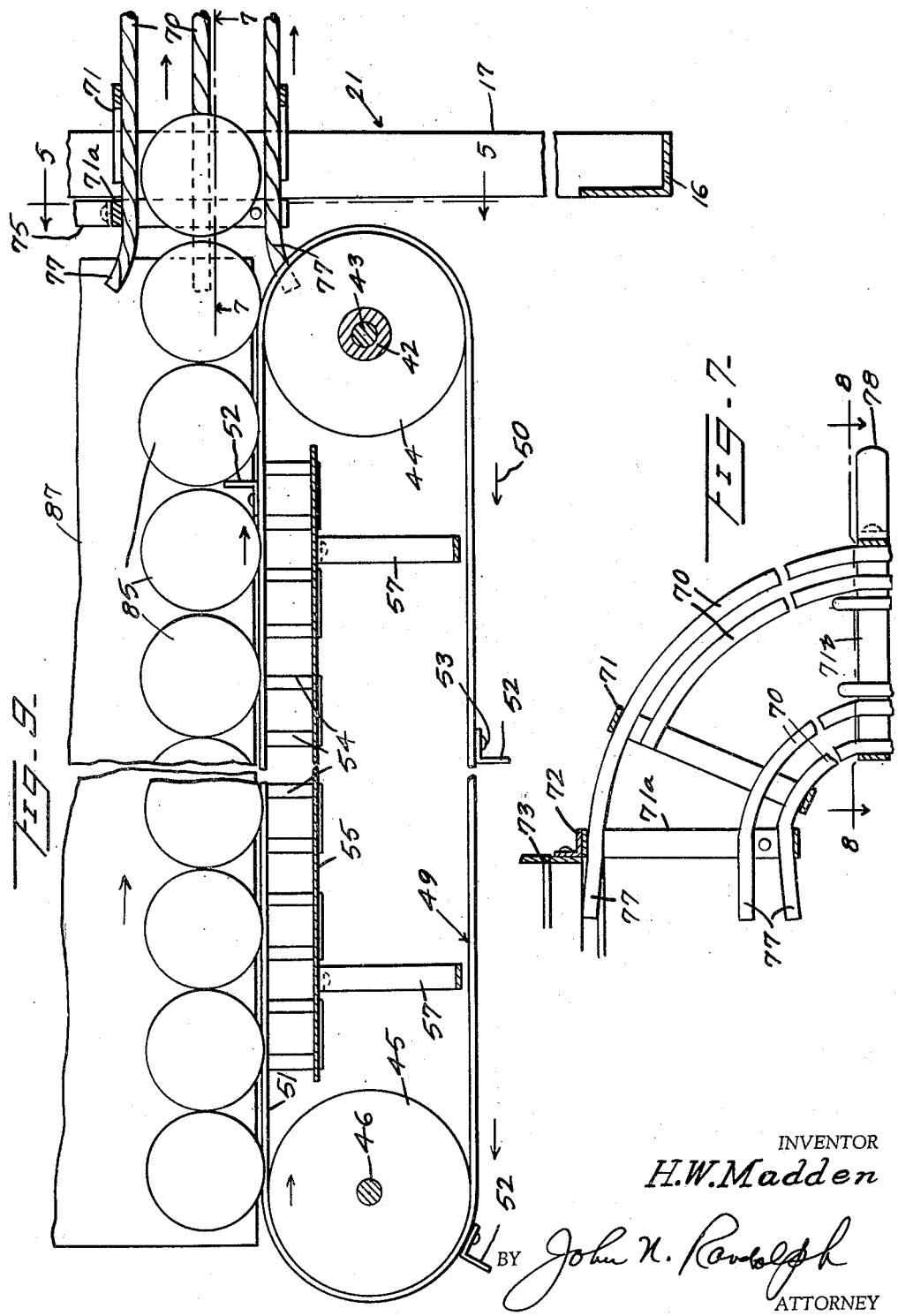

United States Patent Office 2,956,697
Patented Oct. 18, 1960

2,956,697
UNSTACKING MACHINE
Homer W. Madden, P.O. Box 329, Hanover, Ind.
Filed Nov. 10, 1958, Ser. No. 772,954
7 Claims. (Cl. 214—8.5)

This invention relates to a machine for unstacking or unloading articles, such as cans, which are stacked for storage in superposed multi row tiers or layers, and has for a primary object to provide a machine capable of functioning for efficiently and rapidly unloading such stacked articles and in a manner so that the articles unloaded can be conveniently and rapidly conveyed to processing equipment.

More particularly, it is an aim of the invention to provide a machine of extremely simple construction capable of being conveniently controlled by a single operator for effecting a rapid and accurate unloading of stacked articles.

A further object of the invention is to provide an unstacking machine including an elevator or hoist means for positioning successive multi row tiers or layers of the stacked articles in a position from which the articles of a tier or layer can be conveniently removed row by row from the stack and discharged singularly from the machine.

Still a further object of the invention is to provide an unstacking machine wherein the remaining articles of the stack will not be disturbed while one row of the stack is being removed from the stack, conveyed and discharged from the machine.

Various other objects and advantages of the invention will hereinafter become more fully apparent from the following description of the drawings, illustrating a presently preferred embodiment thereof, and wherein:

Figure 1 is a side elevational view, illustrating a presently preferred embodiment of the unstacking machine;

Figure 2 is a side elevational view, looking toward the opposite side of the machine, from the side thereof as seen in Figure 1;

Figure 3 is a horizontal sectional view, on a reduced scale, taken substantially along a plane as indicated by the line 3—3 of Figure 1;

Figure 4 is an enlarged fragmentary transverse vertical sectional view, taken substantially along a plane as indicated by the line 4—4 of Figure 1;

Figure 5 is an enlarged fragmentary vertical sectional view, taken substantially along a plane as indicated by the line 5—5 of Figure 9;

Figure 7 is a fragmentary vertical sectional view, taken substantially along a plane as indicated by the line 7—7 of Figure 9;

Figure 8 is a detailed horizontal sectional view, taken substantially along a plane as indicated by the line 8—8 of Figure 7;

Figure 9 is a fragmentary horizontal sectional view, taken substantially along a plane as indicated by the line 9—9 of Figure 4;

Figure 10 is a fragmentary vertical sectional view, on an enlarged scale, taken substantially along a plane as indicated by the line 10—10 of Figure 4.

Figure 6:
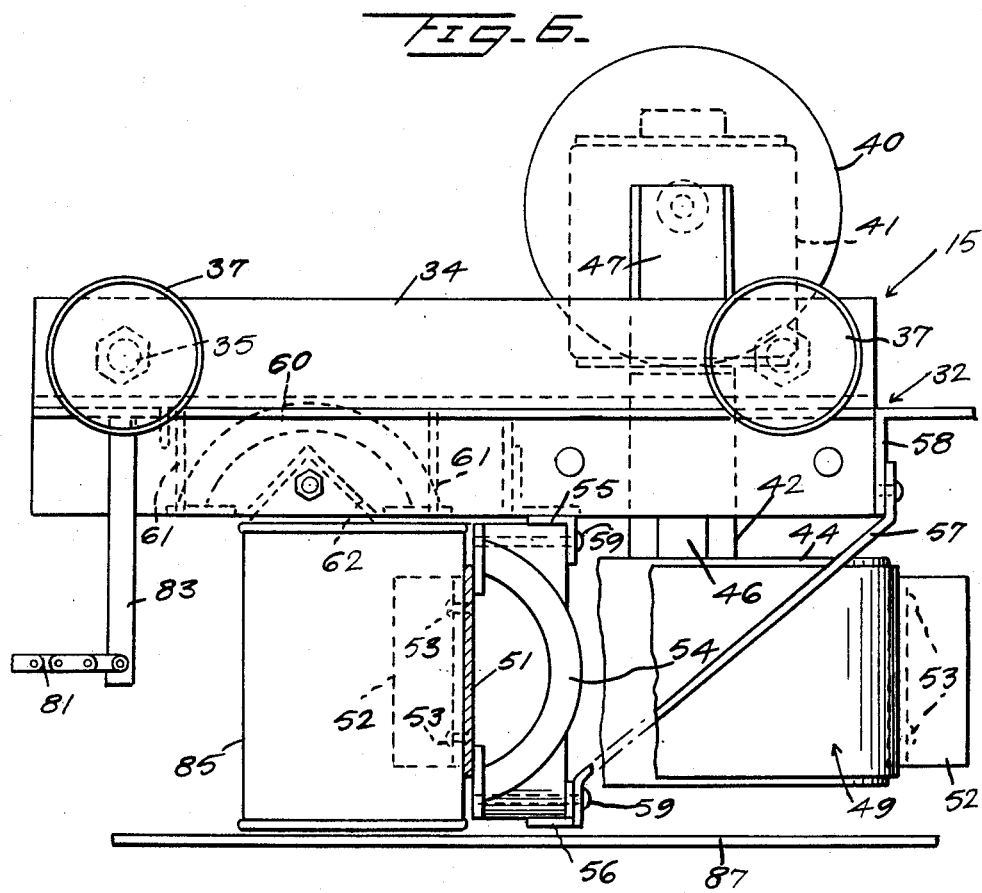
Figure 6 is an enlarged fragmentary vertical sectional view taken substantially along a plane as indicated by the line 6—6 of Figure 4, with certain of the parts omitted.
Figure 11:
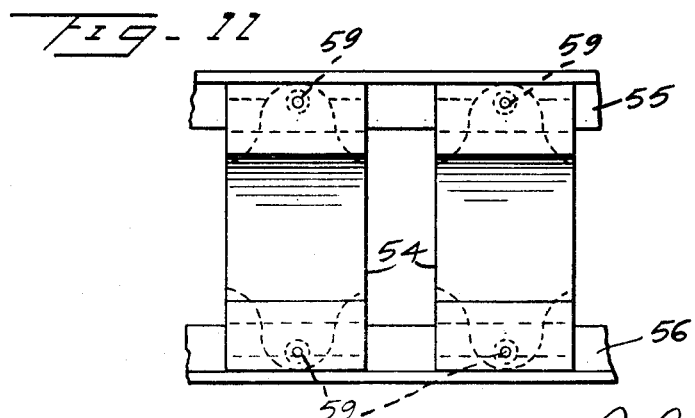
Figure 11 is a fragmentary front elevational view, taken substantially along a plane as indicated by the line 11—11 of Figure 10, and with certain of the parts omitted.

Referring more specifically to the drawings, the unstacking machine in its entirety is designated generally 12 and in general comprises an upright frame, designated generally 13, an elevator or hoist, designated generally 14, around which the frame is disposed, and a traveling carriage 15 which is supported by the frame 13 for movement therein back and forth above the elevator or hoist 14.

The frame 13, as illustrated, is substantially square; however, said frame can be rectangular. The frame 13 includes upright corner posts 16 and has cross braces 17 on three sides thereof, connecting the corner posts 16. As seen in Figure 3, the frame 13 has an open side 18 which is not provided with cross braces 17. A side of the frame 13, located at a right angle to the open side 18 constitutes the forward end 19 thereof and the opposite side constitutes the rear end 20. The side of the frame 13, located opposite the open side 18, constitutes the discharge side 21 thereof. A wall 22 extends across the forward frame end 19 on the inner side of the corner posts 16 thereof, and an upright wall 23 extends along the discharge side 21, likewise inwardly with respect to its corner posts 16. The upper edges of the walls 22 and 23 terminate below the level of the open top of the frame 13, as seen in Figure 1, and the upper edge of the front wall 22 is disposed somewhat above the level of the upper edge of the side wall 23. As seen in Figure 4, top cross braces 24 of angle iron extend across the forward end 19 and rear end 20 and are secured to the upper ends of the corner posts 16. Inwardly opening channel members 25 extend along the sides 18 and 21 and are secured to the upper ends of the corner posts 16, to combine with the braces 24 to form a rigid bracing at the top of the frame 13. The upper surfaces 26 of the bottom portions of the channel members 25 form rails which are inclined downwardly and inwardly. Shims 27 are preferably disposed between the corner posts 16 and the ends of the channel members 25 for slightly canting said channel members and so that the channel members are disposed in slightly downwardly and inwardly inclined relation to one another.

The lower ends of the corner posts rest on any suitable horizontal supporting surface 28 for supporting the frame 13 in an upright position around the elevator 14 which is shown in the form of a conventional fluid pressure operated hoist having a column 29 which is vertically disposed and which extends reciprocably through the supporting surface 28. A flat horizontal base 30 is secured to the flanged upper end 31 of the column 29. While the hoist 14 as illustrated is of a conventional hydraulic or pneumatic type, it will be understood that the machine 12 could be provided with any other form of elevator.

The carriage 15 comprises an elongated chassis 32 of a length somewhat less than the spacing between the channel members 25, as best seen in Figure 4. The chassis 32 includes a top plate 33 having angle members 34 secured to and extending crosswise of the ends thereof. Two stub axles 35 extend through and are secured by fastenings 36 to the upright side of each angle member 34. Small wheels or rollers 37 are journaled on the outer ends of the stub axles 35, beyond the ends of the carriage chassis 32. The wheels or rollers 37 fit loosely in the channels 25 and bear on the rails 26 thereof, and are beveled transversely to conformably fit said rails, as seen in Figure 4. The wheels 37, at each end of the carriage 15, are disposed one adjacent a forward side 38 and the other adjacent a rear side 39 of said carriage, as seen in Figure 5. A power source 40, preferably an electric motor, is fixedly mounted in the upper side of the chassis top plate 33 and has a reduction gear unit 41 fixed to and extending from one end of the motor housing. A drive socket 42 extends downwardly from the reduction gear unit 41 loosely through the top plate 33. The drive socket 42 is driven from the motor 40 and at a reduced speed relative to said motor by conventional shaft and gearing, not shown, contained within the reduction unit 41. A stub shaft 43 is fixed to and extends downwardly from the lower end of the socket 42 and is disposed in and fixed to a large belt pulley 44. The socket 42 is located adjacent one rear corner of the chassis 32 and supports the belt pulley 44 therebeneath. An idler belt pulley 45 is supported beneath the other rear corner of the chassis 32 by a shaft 46 which is fixed thereto and extends upwardly therefrom. The shaft 46 is journaled in vertically aligned bearings 47 which are fixed to and supported by the chassis 32. A collar 48 is fixed to the upper end of the shaft 46 and bears upon the upper bearing 47 for supporting said shaft and the idler belt pulley 45. An endless belt 49 is trained around the pulleys 44 and 45 and is driven by the pulley 44 in a direction as indicated by the arrows 50 in Figures 1, 4 and 9. Thus, the front flight 51 of the belt 49 travels toward the discharge side 21 of the frame 13. The belt 49 is supported in substantially a horizontal plane and with the flights thereof disposed vertically. Cleats 52 of angle iron are secured by fastenings 53 to the exterior of the belt 49, in longitudinally spaced relation to one another, and so that said cleats extend crosswise of the belt or conveyor.

Accordingly, as best seen in Figures 5 and 6, the endless conveyor or belt 49 is located adjacent the rear side 39 of the carriage 15.

A plurality of permanent magnets 54 are supported in side-by-side relation to one another between the belt pulleys 44 and 45 and between the flights of the belt or conveyor 49 and are suspended or hung beneath the chassis 32 by an upper angle member 55 and a lower angle member 56. The upper angle member 55 is suitably secured to the underside of the chassis 32 and the lower angle member 56 is supported by braces 57. The braces 57 extend upwardly and rearwardly from said lower angle member 56, between the pulleys 44 and 45 and the belt flights and are secured at their upper ends to a depending rear flange 58 of the chassis 32. The individual magnets 54 are secured by fastenings 59 to the angle members 55 and 56 and extend forwardly therefrom so as to bear against the inner side of the front belt flight 51, as best seen in Figures 5 and 6.

The carriage 15 includes a second set of permanent magnets 60 which are disposed in horizontal positions within the chassis 32, above and forwardly of the aforementioned upright magnets 54. The magnets 60 are disposed in inverted positions and are supported in any suitable manner within the chassis 32, as by hanger members 61. A rail 62, of inverted U-shape cross section, is disposed within the chassis 32 and is suitably supported therein by vertical wall members 63 of said chassis. The track 62 extends longitudinally of the chassis and within the permanent magnets 60 and has its bottom edges extending slightly below the bottom surfaces of said magnets 60, as seen in Figures 5 and 6.

Referring to Figures 2, 7, 8 and 9, a discharge chute 64 is mounted on the discharge side 21 of the frame 13 and includes an extensible and retractable intermediate chute section 65 interposed between adjacent ends of an inlet end section 66 and an outlet end section 67. The intermediate section 65 is connected at its ends to adjacent ends of the sections 66 and 67 by knee joints 68 and 69, respectively. Said knee joints and the intermediate section 65 may correspond with the knee joints and intermediate section as disclosed in my prior Patent No. 2,720,302. One fastening of the lower knee joint 69 extends through one or both braces 17 of the frame side 21 for supporting the intermediate section 65 and the discharge section 67, for swinging movement of the intermediate section 65 back and forth across the frame side 21. Only a part of the discharge section 67 of the chute has been illustrated, as said chute section may be extended to connect with another chute or other conveyor means, not shown, for conveying the articles passing downwardly through the chute 64 to other processing machines or equipment. For example, the articles may be conveyed from the chute 64 to a labeling machine.

The upper inlet section 66 includes cables or other flexible members 70 forming the sides, top and bottom of the chute, which are held correctly disposed relative to one another by rectangular frame members 71, through which the cables 70 extend and to which each cable is secured. The uppermost frame member 71a has an angle bracket 72 secured to the top part thereof and having an upstanding flange portion which is secured against a part 73 of the end of the chassis 32, which is located adjacent the frame side 21, by fastenings 74, as best seen in Figure 5. A brace 75 is secured at its lower end to a forward side of the frame member 71a and at its upper end to the chassis part 73, to combine with the fastenings 74 for rigidly supporting the frame 71a, constituting the inlet end of the chute 64, on the carriage 15. The other side of the frame 71a is cutaway, as seen at 76 (Figure 5), to permit the forward belt flight 51 to pass out of the frame 71a and around the drive pulley 44. The cable 71 which is secured to said inner side of the frame 71a is connected thereto below the cutout 76, and is thus disposed below the belt flight 51. The ends of the cables 70 project only a short distance inwardly beyond the frame 71a and are flared outwardly at their terminals, as seen at 77, for flaring or enlarging the entrance opening or inlet end of the chute 64. One of the frame members 71b, which is disposed below but adjacent the inlet end of the chute 64, has fixed thereto an outwardly projecting handle 78, as seen in Figures 7 and 8.

As seen in Figures 1 and 2, bearing brackets 79 are fixed to and extend outwardly from the front corner posts 16, in a direction away from the front frame side 19. Said bearing brackets 79 support sprocket wheels 80 the upper portions of which are disposed slightly above the level of the bottom edge of the conveyor belt 49. Chains 81 are trained over the sprocket wheels 80 and have depending ends which are spaced outwardly from the front frame side 19 and to which are connected weights 82. The other ends of the chains 81 extend into the frame over the wall 22, and the opposite end of one of said chains is secured to the brace 75, as seen in Figure 5. The opposite end of the other chain 81 is secured to a hanger member 83, as seen in Figures 1 and 6. The hanger member 83 is rigidly secured to and extends downwardly from the end of the chassis 32, which is disposed adjacent the frame side 18, and is disposed forwardly with respect to the upper magnets 60. The weights 82 maintain the portions of the chains 81, located between the carriage 15 and sprocket wheels 80, in extended substantially horizontal positions, as seen in Figures 1 and 2.

The elevator or hoist 14 is lowered to adjacent the floor or supporting surface 28, and a pallet 84, containing articles to be unstacked, is placed upon the platform 30 thereof. As illustrated, the pallet 84 contains cans 85 which are stacked upon said pallet in upright positions and in superposed tiers or layers 86, each of which contains a plurality of rows of cans, and which tiers or layers 86 are preferably separated by flat partition members or plates 87. The operator of the machine 12 then moves the carriage 15 to the rear end 20 of the frame 13 by exerting a manual pressure on the handle 78. While the carriage 15 is held at the rear end of the frame 13, the elevator or hoist 14 is operated to lift the pallet 34 and tiers of cans contained thereon and until the uppermost tier 86 is located slightly above the level of the upper edge of the side wall 23, and with the bottom of said tier somewhat below the level of the upper edge of the front wall 22. The horizontal portions of the chains 81 will then closely straddle the upper tier 86. The several tiers of cans 86 will be disposed in sufficiently close proximity to the front wall 22 so that none of the cans can be pushed forwardly off of the stack. Similarly, cans of all of the tiers 86, except the uppermost tier, will be disposed in sufficiently close proximity to the side wall 23 so that none of the cans of said lower tiers can be pushed laterally from the stack toward the discharge side 21 of the frame.

With the elevator or hoist 14 at a correct elevation so that the upper tier of cans 86 is located at the level as shown in Figures 1 and 2, and with the motor 40 operating for driving the endless conveyor 49 in the direction as indicated by the arrows 50, the carriage 15 is moved from the rear end 20 toward the forward end 19 of the frame 13 until the front conveyor flight 51 is in close proximity to the adjacent transverse row of cans 85 of the upper tier 86. The upper magnets 60 are supported by the chassis 32 so as to pass over the cans of the upper tier 86 and are disposed sufficiently close thereto so that the cans 85 of the first transverse row will be lifted by said upper magnets 60 slightly off of the partition 87 and against the bottom edges of the rail 62. At approximately the same time, the cans 85 of said first transverse row, located nearest the conveyor 49, will be drawn slightly away from the next adjacent transverse row of cans and against the front flight 51 of the conveyor by the vertical or rear set of magnets 54 and will be held against the outer side of said front coveyor flight 51 by said magnets 54. Portions of certain of the cans 85 will assume positions straddling the lugs or pusher elements 52 of the front flight 51, as seen in Figure 9. As the front flight 51 moves toward the discharge side 21 of the frame 13, the transverse row of cans 85 which are then supported by the magnets 54 and 60 against the front conveyor flight 51 and the upper rail 62, will be conveyed with said front conveyor flight toward the inlet 71a of the chute 64, said cans being pushed by the lugs or pusher elements 52. As the individual cans 85 approach the chute inlet 71a, as seen in Figure 9, said cans will move beyond the rows of magnets 54 and 60 and will thus be released from their magnetic attraction to the carriage 15 and will thereafter return to rest upon the uppermost partition or separator 87 and will thereafter be pushed into the inlet end of the chute 64 by the other trailing cans which are still held against the belt flight 51 and rail 62 by magnetic attraction.

The cans 85 move downwardly through the chute 64 by gravity. As the last can 85 of a transverse row of cans is pushed into the chute 64 by one of the lugs 52, the carriage 15 is manually advanced toward the forward frame end 19, sufficiently so that the aforedescribed operation can be repeated with the next transverse row of cans. After one tier of cans has thus been unstacked, the carriage 15 is returned to a position at the rear frame end 20 and the uppermost separator 87 is then removed, after which the hoist 14 is raised sufficiently to position the next tier 86 at a proper level for unstacking the cans thereof.

After the cans have thus been completely unloaded from the pallet 84, the elevator or hoist 14 is lowered and the empty pallet 84 is removed and replaced by a full pallet, and the operation previously described is repeated. It will be understood that the full pallets 84 are applied to the machine 12 through the open frame side 18 and the empty pallets are removed through said open side 18.

From the foregoing it will be apparent that the machine 12 may be efficiently operated by one worker for rapidly unstacking or unloading cans or similar articles which are capable of being attracted to the carriage by magnetic attraction, and which unloading or unstacking operation can be accomplished with a maximum of speed and efficiency and a minimum of manual labor. It will also be apparent that the machine by which these results are realized is of extremely simple construction and may be very economically manufactured and sold, will be extremely efficient and durable in use and can be operated at little expense. It will also be apparent that the frame 13 and carriage 15 of the machine 12 may be utilized with conventional hoists, such as the hoist 14, which are frequently available where cans or similar articles are handled.

Various modifications and changes are contemplated and may be resorted to, without departing from the function or scope of the invention as hereinafter defined by the appended claims.

I claim as my invention:

1. An unstacking machine comprising a frame, a carriage, means mounting the carriage for reciprocating movement in the frame, a driven endless conveyor supported by the carriage including a flight extending and traveling in a direction crosswise of the direction of movement of the carriage, means adapted to support a multi row tier of articles of magnetic material within said frame and in the path of movement of the carriage, means supported by the carriage for lifting a row of said articles vertically away from said supporting means, and means supported by the carriage for drawing said row of articles horizontally toward and against said conveyor flight whereby the articles, supported by said means for lifting the articles, are conveyed with said conveyor flight, said means for lifting the articles and said means for drawing the articles horizontally extending to adjacent an end of the conveyor toward which said flight travels for releasing the articles for discharge from the machine at said end of the endless conveyor.

2. An unstacking machine as in claim 1, said endless conveyor comprising an endless belt having pusher elements projecting outwardly therefrom for pushing the articles disposed against said conveyor flight toward said conveyor end.

3. An unstacking machine as in claim 2, and a track supported by the carriage and beneath which said articles engage when supported from above by said first mentioned magnetic means.

4. An unstacking machine as in claim 1, and means connected to and movable with said carriage and between which the articles, other than the row of articles being conveyed by said conveyor flight, are confined to prevent premature discharge of the other articles from the machine.

5. An unstacking machine as in claim 1, said means for supporting the articles within the frame comprising a hoist around which the frame is disposed and above which the carriage is movable, said hoist being adapted to support a plurality of superposed tiers of the articles for successive movement of the tiers into a position in the path of movement of the carriage, said frame having an open side disposed opposite to the side thereof toward which the articles are conveyed for discharge, and said hoist being adapted to be loaded with articles to be unstacked through said open frame side.

6. In combination with a hoist on which is adapted to be mounted a pallet containing cans of magnetic material stacked in superposed multi row tiers, a frame disposed in an upright position around said hoist and the stacked cans supported thereby, a carriage, means mounting said carriage for reciprocating movement in an upper portion of the frame and over said hoist, a driven endless conveyor supported by the carriage and having a flight extending and traveling in a direction crosswise of the directions of movement of the carriage, said hoist being operable for elevating the stacked cans for successively positioning uppermost tiers of the cans in the path of travel of the carriage, a first magnetic means supported by said carriage for lifting a row of cans of the uppermost tier off of the stack, and a second magnetic means supported by the carriage for drawing said row of cans against said conveyor flight whereby the cans, supported by said magnetic means in engagement with the carriage, will be conveyed with said first conveyor flight relative to the carriage, said magnetic means terminating adjacent the end of the endless conveyor, toward which said first and second flight travels, for releasing the cans for discharge from the machine at said end of the endless conveyor.

7. A machine as in claim 6, and pusher elements fixed to said endless conveyor for engaging certain of the cans for causing the cans to move in unison with said conveyor flight and for pushing cans, released by said magnetic means, into a position to be discharged from the machine.

References Cited in the file of this patent

UNITED STATES PATENTS

| | | |
|---|---|---|
| 1,773,646 | Skov | Aug. 19, 1930 |
| 2,338,048 | Minaker et al. | Dec. 28, 1943 |
| 2,600,726 | Behrens | June 17, 1952 |
| 2,720,302 | Madden | Oct. 11, 1955 |
| 2,729,344 | Birchall | Jan. 3, 1956 |
| 2,766,043 | Buccicone | Oct. 9, 1956 |
| 2,767,863 | Botley | Oct. 23, 1956 |
| 2,806,578 | Jones et al. | Sept. 17, 1957 |